(12) United States Patent
Veneroso (10) Patent No.: US 11,272,370 B2
(45) Date of Patent: Mar. 8, 2022

(54) METHOD FOR MANAGING PROFILES IN EMBEDDED UNIVERSAL INTEGRATED CIRCUIT CARDS

(71) Applicant: STMicroelectronics S.r.l., Agrate Brianza (IT)

(72) Inventor: Amedeo Veneroso, Caserta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/823,004

(22) Filed: Mar. 18, 2020

(65) Prior Publication Data
US 2020/0314638 A1 Oct. 1, 2020

(30) Foreign Application Priority Data

Mar. 29, 2019 (IT) .................. 102019000004809

(51) Int. Cl.
| | |
|---|---|
| *H04M 1/66* | (2006.01) |
| *H04W 12/30* | (2021.01) |
| *H04W 4/60* | (2018.01) |
| *H04W 4/50* | (2018.01) |
| *H04L 29/06* | (2006.01) |
| *H04L 67/306* | (2022.01) |
| *H04W 8/18* | (2009.01) |
| *H04W 12/06* | (2021.01) |
| *H04W 88/02* | (2009.01) |

(52) U.S. Cl.
CPC ......... *H04W 12/35* (2021.01); *H04L 63/0853* (2013.01); *H04L 67/306* (2013.01); *H04W 4/50* (2018.02); *H04W 4/60* (2018.02); *H04W 8/183* (2013.01); *H04W 12/06* (2013.01); *H04W 88/02* (2013.01)

(58) Field of Classification Search
USPC .................. 455/411, 466, 558; 1/1
See application file for complete search history.

(56) References Cited

U.S. PATENT DOCUMENTS

| | | | |
|---|---|---|---|
| 10,021,558 B2 * | 7/2018 | Lalwaney | H04L 67/34 |
| 2012/0106533 A1 | 5/2012 | Chen et al. | |
| 2012/0289197 A1 * | 11/2012 | Holtmanns | H04M 1/675 455/411 |

(Continued)

FOREIGN PATENT DOCUMENTS

EP 3429243 A1 1/2019

OTHER PUBLICATIONS

GSM Association, "Remote Provisioning Architecture for Embedded UICC", Technical Specification, Version 4 0, Feb. 25, 2019, 399 pages.

(Continued)

*Primary Examiner* — David Q Nguyen
(74) *Attorney, Agent, or Firm* — Slater Matsil, LLP (57) ABSTRACT

A communication device includes an integrated smart card and a software profile management module. The software profile management module is configured to store profiles in the smart card, receive an operation request that includes an indication of a requested operation and an identifier of the smart card, check whether the operation request corresponds to an identifier of the smart card that is available in a repository server, and perform the requested operation only if the operation request is available in the repository server.

22 Claims, 8 Drawing Sheets

(56) References Cited

U.S. PATENT DOCUMENTS

| 2015/0303966 | A1* | 10/2015 | Lee | H04L 67/306 |
| | | | | 455/466 |
| 2016/0006728 | A1 | 1/2016 | Park et al. | |
| 2017/0289792 | A1* | 10/2017 | Park | H04W 4/70 |
| 2019/0327605 | A1* | 10/2019 | Fan | H04W 12/35 |
| 2020/0344594 | A1* | 10/2020 | Larignon | H04W 12/42 |
| 2020/0374686 | A1* | 11/2020 | Zhang | H04L 67/34 |

OTHER PUBLICATIONS

GSM Association, "Remote Provisioning Architecture for Embedded UICC", Technical Specification, Version 1 0, Dec. 17, 2013, 294 pages.

* cited by examiner

METHOD FOR MANAGING PROFILES IN EMBEDDED UNIVERSAL INTEGRATED CIRCUIT CARDS

CROSS-REFERENCE TO RELATED APPLICATIONS

This application claims priority to Italian Patent Application No. 102019000004809, filed on Mar. 29, 2019, which application is hereby incorporated herein by reference.

TECHNICAL FIELD

Embodiments of the present disclosure relate to a method for managing profiles in Embedded Universal Integrated Circuit Cards, a corresponding system and computer program product.

BACKGROUND

Due to new requirements of miniaturization and robustness, the industry has developed an evolution of the traditional UICC (Universal Integrated Circuit Card) cards, a smart card integrated in the communication device which is called "embedded UICC". This evolution envisages that the UICC is soldered (or in any case made hardly accessible) in the hosting device that can be a mobile phone, a modem, a board inserted in a device, etc.

Soldering presents distinct advantages such as the possibility of reducing the size of the UICC device and hence of the modem, the improvement of the robustness of the contacts (soldered contacts are typically more reliable than interfaces between replaceable components), the increased antitheft protection.

On the other hand, soldering a UICC (or making it hardly accessible) introduces new requirements and issues that need to be addressed. As the UICC is not replaceable, means should be available to allow the operator change. Specific operations (such as device repairing), that today are typically performed after the UICC removal, require a way to disable the SIM card.

To address the above requirements, the industry has defined a new technological standard called "embedded UICC" or "Remote SIM provisioning".

The basic concepts of the new technological standard are the following:

one entity is defined to allow the download/enable/delete of profiles (for instance the Issuer Secure Domain Root ISD-R, see for instance "*Remote Provisioning Architecture for Embedded UICC, Technical Specification*, Version 1.0, 17 Dec. 2013");

the UICC may contain several mobile network operator subscriptions;

each operator subscription is represented by a "profile";

every profile may be seen as a container; the container is managed by a security domain (for instance the Issuer Secure Domain Profile ISD-P).

In the eUiCC (embedded UICC) card it is known to provide generation of profiles, in particular personalized profile package data.

A Profile is a combination of a file structure, data and applications which are stored in an eUICC. A Profile Package is a Personalized Profile using an interoperable description format which is transmitted to an eUICC in order to load and install a Profile.

For instance the consortium SIMalliance defines an interoperable format to represent a Profile Package as defined for instance in the SIMalliance reference document "eUICC Profile Package: Interoperable Format Technical Specification", available at the URL http://simalliance.org/wp-content/uploads/2015/3/Profile-interoperability-technical-specification_V1-0.pdf and subsequent versions. Such interoperable format represents the structure of data to be built by the profile generating node, e.g., Profile Creator and to be loaded in the eUICC card in order for the eUICC to be personalized according to the content of the Profile Package. The Profile Creator is an entity in charge of creating the Profile Package based on the MNO (Mobile Network Operator) requirements.

Two families of embedded UICCs are currently defined:
the eUICC Industrial cards;
the eUICC Consumer cards;

The eUICC Industrial cards are directed to application in automotive/M2M devices managed by a Service provider. Such devices are typically unattended, i.e., without the interaction of an End User. Thus the operation regarding the managing of software and profiles, e.g., Load/Enabled/Disable/Delete are issued by a remote server, representing the service provider, since the device performs these operations unattended.

On the other hand, the eUICC Consumer cards are directed to mobile phones, smartwatches, and similar device which are typically attended. Therefore, operations for managing software and profiles are issued by the local device, representing the user intent. The device performs these operations attended, i.e., with the interaction of an End User.

Figure 1:
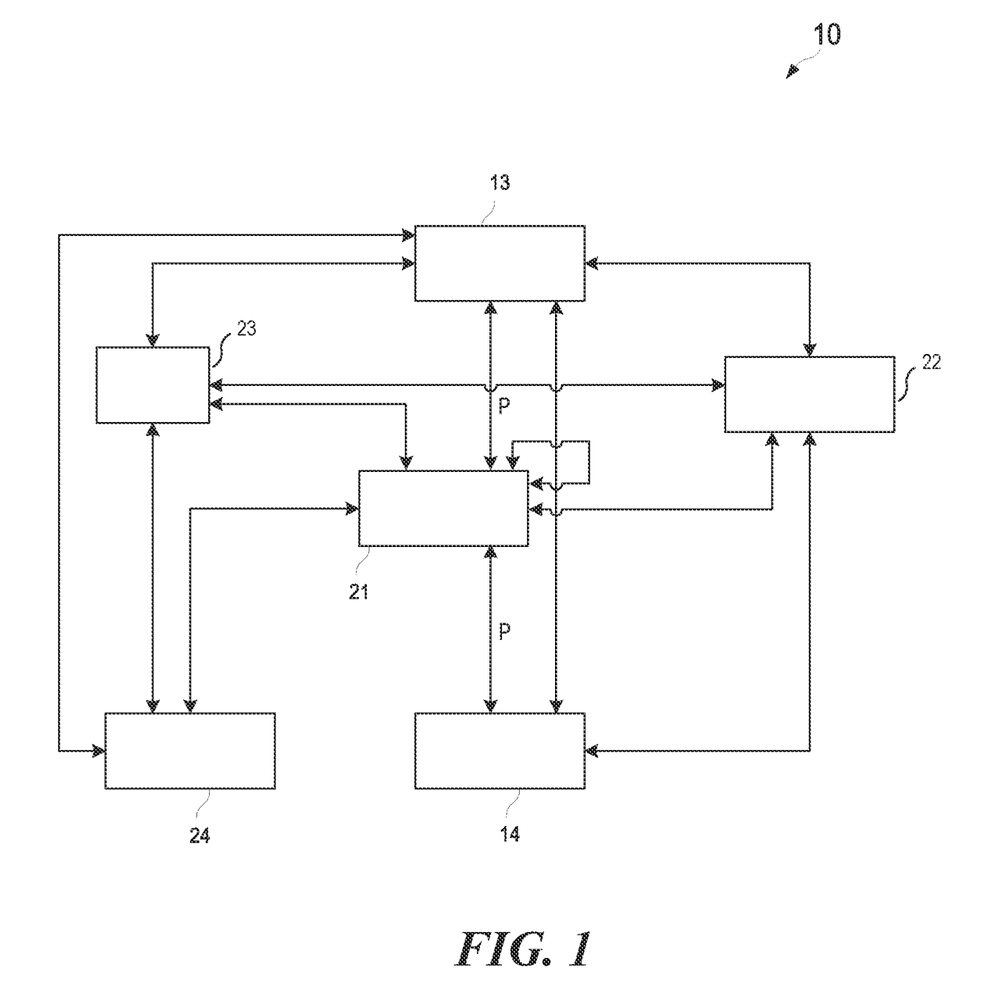

FIG. 1 shows a schematic representation of a system 10 for managing profiles in industrial eUICC cards, which includes a data preparation server 13, e.g., a SM-DP server, responsible for the creation, generation, management and the protection of resulting profiles at the input/request of the operator. Such data preparation server 13 for instance may include a database of profiles and, additionally other modules like an OTA RFM (Over The Air Remote File Management) engine and a Keys Manager. The data preparation server 13 provides, for instance through an OTA (Over The Air) channel, profiles P, in particular personalized profiles, to a Secure Routing server 21, e.g., a SM-SR server, which is configured to secure routing of profiles and usually sends a profile download enabling command to the eUICC card 16, which is embedded in a local equipment 14, i.e. a smart card integrated in a local communication device, thus enabling download and storing of the profile P in the eUICC card 16. The system 10 includes also a Mobile Network Operator (MNO) 22, which can issue for instance a profile ordering command to the data preparation server 13. In FIG. 1 are also indicated a Certificate Issuer 23, which issues Certificates for remote SIM provisioning entities and acts as a trusted third party for the purpose of authenticating the entities within the system, and an eUICC Manufacturer (EUM) 24 which is responsible for the initial cryptographic configuration and security architecture of the eUICC 16 and is the provider of eUICC products. These system components are not here described in further detail. A description of the operation of the system 10 can be found at https://www.gsma.com/iot/wp-content/uploads/2014/01/1.-GSMA-Embedded-SIM-Remote-Provisioning-Architecture-Version-1.1.pdf and subsequent versions.

Thus, in the system 10, the SM-DP (server 13, an OTA server) contains profiles and represents the MNO. The SM-SR (server 21, also an OTA server) executes commands [load/enable . . . ] in batches over the device installation basis, e.g., downloading profiles on all the cards on the field.

Despite the industrial architecture was originally defined for the IoT (Internet of Things)/Automotive application, for IoT it is not always the best approach since the SM-DP server needs to be implemented by MNOs to enable IoT, which requires an effort on the part of the MNOs which in this segment of marker are often not big or very active. In addition, the IoT provider needs to offer the SM-SR service that for small IoT providers could be expensive. Finally, interconnections between SM-DP and SM-SR server requires effort (legal agreements, key ceremony, etc.) leading to a complexity of interworking.

SUMMARY

Embodiments of the present disclosure relate to solutions for managing profiles in a smart card integrated in a local communication device configured to operate with a mobile communication network, the local communication device comprising a software profile management module configured to store profiles in the smart card and perform operations on the profiles stored in the smart card upon receiving an operation request from the mobile communication network. Particular embodiments of the present disclosure relate to eUICC inserted in (Universal Integrated Circuit Card) devices which are unattended by a user, but also to eUICC inserted in devices which are attended by a user. Embodiments of the present disclosure may also relate to cards according the SSP (Smartcard Secure Platform) ETSI standard.

Embodiments can provide solutions which overcome one or more of the previously outlined drawbacks.

Embodiments moreover concerns a related system for the personalization of integrated circuit cards module as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

As mentioned in the foregoing, the present disclosure provides solutions regarding a method for managing profiles in a smart card integrated in a local communication device configured to operate with a mobile communication network. The local communication device comprises a software profile management module configured to store profiles in the smart card and perform operations on the profiles stored in the smart card upon receiving an operation request from the mobile communication network. The method comprises storing, in particular by an entity authorized to provide eUICC profiles and/or request operations regarding a profile to be executed locally in a smart card, an operation request in a repository server, the operation request including an indication of a requested operation and an identifier of the smart card on which the requested operation is to be performed. The profile management module in an user equipment comprising an integrated smart card with a given card identifier periodically checks if an operation request comprising a card identifier corresponding to the card identifier of the profile management module is available in the repository server. If the operation request with a corresponding card identifier is available in the repository server, the requested operation is executed at the profile management module.

In variant embodiments, the solution here described may include that the requested operation include a profile download operation, the operation request including a network address of a preparation server in which a profile to be downloaded is stored, and the profile management module, upon accessing the operation request accessing the preparation server at the network address, downloading the profile to be downloaded in the smart card integrated in in a local communication device.

In variant embodiments, the solution here described may include associating to the operation request a signature prior storing in the repository server, verifying the operation request by verifying the signature at the local communication device prior performing the corresponding requested operation issuing an authentication reply to the profile management module, and performing the corresponding requested operation if the authentication reply is positive.

In variant embodiments, the solution here described may include that the requested operation includes an operation on a profile stored in the smart card.

In variant embodiments, the solution here described may include that the requested operation is an operation on a profile stored in the smart card selected among:
Enable Profile
Disable Profile
Delete Profile
Retrieve Status In variant embodiments, the solution here described may include that the requested operation is a signed token stored in the repository server, which is polled by the profile management module and executed directly.

In variant embodiments, the solution here described may include that the operation of checking periodically by the profile management module includes a periodical polling of the repository server by the profile management module according to a given polling period.

In variant embodiments, the solution here described may include that the operation request includes an identifier of the profile target of the operation (ICCID)

In variant embodiments, the solution here described may include that the software profile management module is a LPA (Local Profile Assistant) and the smart card is an eUICC (Embedded Universal Integrated Circuit Card)

In variant embodiments, the solution here described may include that the smart card is a card operating according to the Secure System Platform standard.

The present disclosure provides also solutions regarding a system for managing profiles in a smart card integrated in in a local communication device, for example, an eUICC, configured to operate with a mobile communication network. The local communication device comprises a software profile management module, for example a LPA module, configured to store profiles in the smart card and perform operations on the profiles stored in the smart card upon receiving an operation request from the mobile communication network. The system includes a node of the mobile communication network configured to store an operation request in a repository server comprised in the architecture. The operation request includes an indication of the requested operation and an identifier of the smart card. The profile management module is configured to check periodically if an operation request corresponding to an identifier of the smart card is available in the repository server, and, if the operation request is available in the repository server, performing the requested operation.

In variant embodiments, the system here described may include a preparation server in which a profile to be downloaded is stored, the requested operation includes a profile download operation, the operation request including a network address of the preparation server in which a profile to be downloaded is stored, and the profile management module, upon accessing the operation request, being configured to access the preparation server at the network address and to download the profile to be downloaded in the smart card integrated in in a local communication device.

In variant embodiments, the system here described may include that the requested operation includes an operation on a profile stored in the smart card.

In variant embodiments, the system here described may be configured to perform operations of the method according to any of the previous embodiments.

The present disclosure provides also solutions regarding a computer-program product that can be loaded into the memory of at least one processor and comprises portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting example and in which:

FIG. 1 has already been described in the foregoing;

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification is not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIG. 1 are denoted by the same references previously used in such figures; the description of such previously described elements will not be repeated in the following in order not to overburden the present detailed description.

Figure 2:
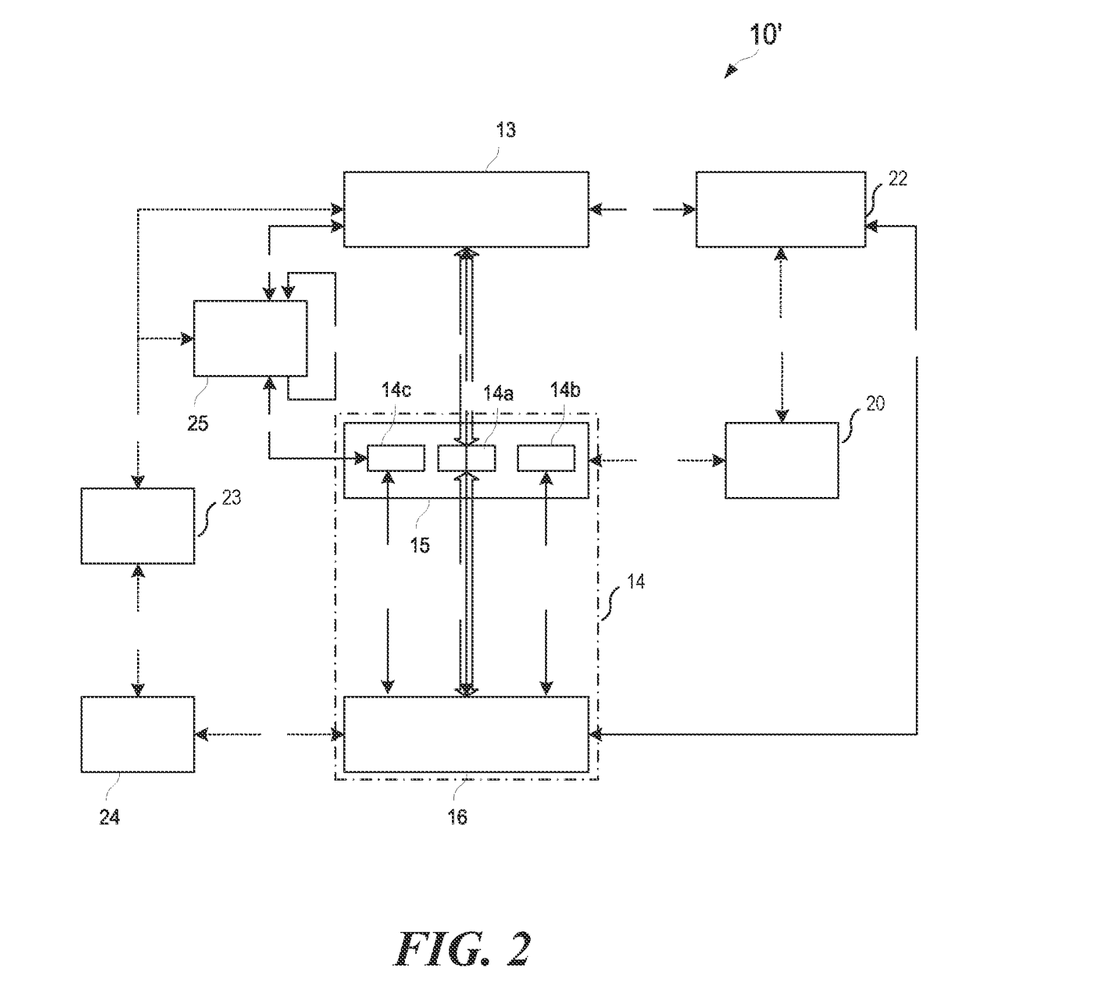
FIG. 2 schematically describes a solution for managing profiles in consumer eUICCs.

In FIG. 2 it is shown a schematic representation of a system 10' for managing profiles in consumer eUICC cards, where the data preparation server 13, which is specifically a SM-DP+, i.e. Subscription Manager Data Preparation—enhanced compared to the SM-DP in SGP.2, interacts directly with the local equipment 14, e.g. a mobile telephone or smartphone, and specifically with a software profile management module configured to store profiles in the eUICC 16 and perform operations on the profiles P stored in the eUICC 16, such module being is specifically a LPA (Local Profile Assistant) software module 15.

The LPA module 15 is a software running in the local equipment 14 and provides LPA services, such as Profile download or Profile management, to the eUICC 16. The LPA consists of two pails—the LPD (Local Profile Download) 14a and the LUI (Local User Interface) 14b. The LPD 14a plays a proxy role for the efficient download of a Bound Profile Package between SM-DP+ 13 and eUICC 16, while the LUI interface 14b allows for local profile management on the device by an end user 20, also shown in FIG. 2, which can interact with the local equipment 14 through a user interface or with the MNO 22 through an operator interface. A Local Discovery Service (LDS) 14c is also shown as included in the LPA module 15. The system 10' includes also a Subscription Manager Discovery Server (SM-DS) 25 to provide mechanisms that allow an SM-DP+, like the server 13, to inform the Local Discovery Service 14c within any device that an SM-DP+ like server 13 wishes to communicate with it. A description of the operation of system 10' can be found at https://www.gsma.com/aboutus/wp-content/uploads/2015/m/FS.8_SAS-SM_Standard_v3.0.pdf.

Thus in the consumer architecture of the system 10' the SM-DP+ server (an OTA server) contains profiles and represents the MNO. The LPA (an application on the local equipment, e.g. the phone) executes commands [load, enable . . . ] on the user equipment phone. The user changes operator, for instance, by means of the GUI (Graphic User Interface) of the LPA.

In brief the method and system for managing profiles in eUICC here proposed adapt the LPA to the IoT scenario, reusing the consumer system ecosystem and addressing the issue that the device is unattended. In particular, the consumer system components which are reused without modification are the eUICC, for instance SGP.22 compliant, and the enhanced data preparation server, SM-DP+ also SGP.22 compliant. Maintaining unmodified the SM-DP+ is particularly relevant, since it is managed by the MNO so it is hard to update. In the system a repository server, managed by the OEM, is added, which can be also defined as SM-OD (Subscription Manager-Operation Discovery) server. The LPA software modules are modified.

Figure 3:
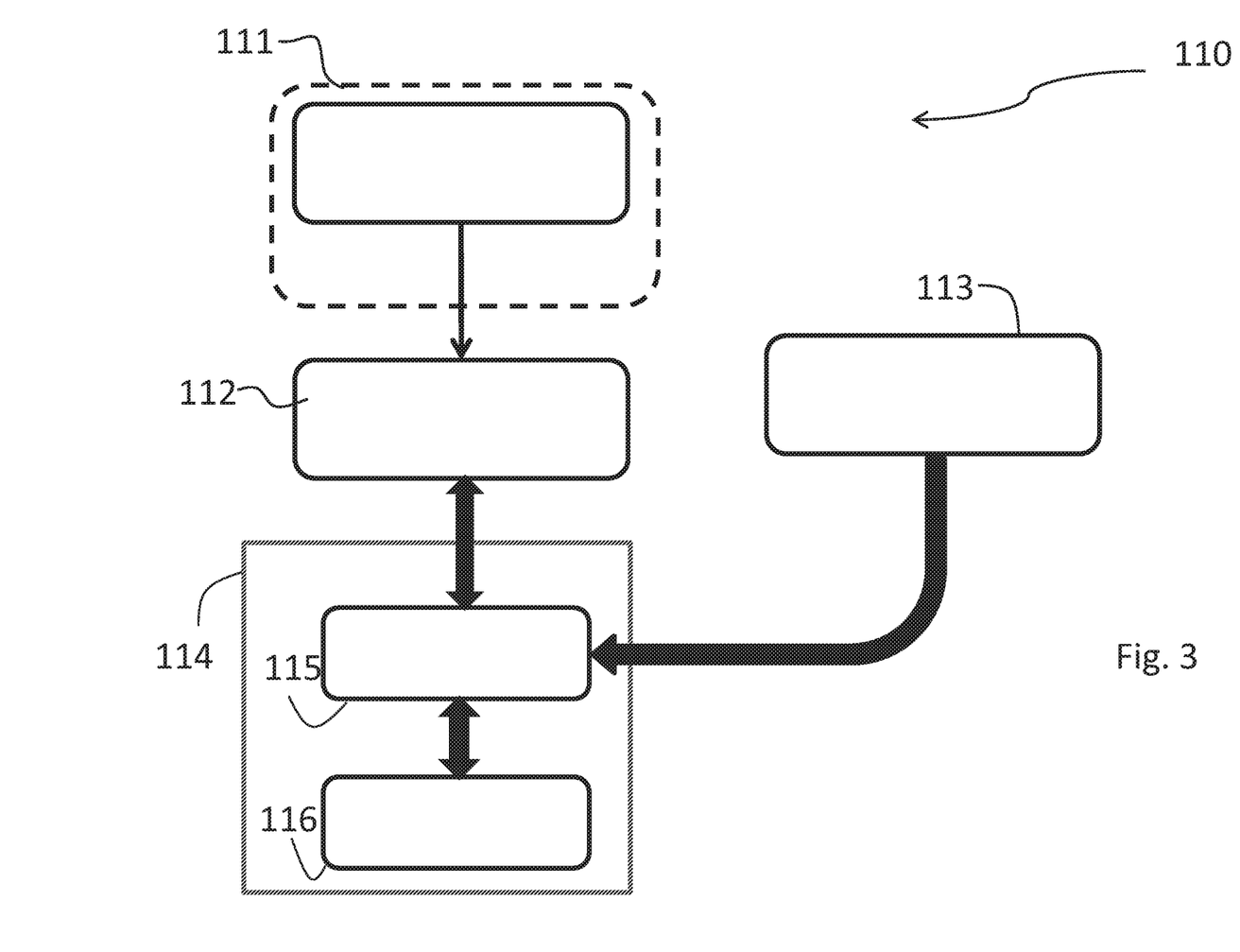
FIG. 3 schematically describes a system for managing profiles in eUICCs implementing the method for managing profiles in eUICCs here described.

Thus, in FIG. 3 is represented a system no for managing profiles in a smart card integrated in a local communication device, specifically a eUICC 116 comprised in a local communication device 114 configured to operate with a mobile communication network, e.g., access the network and exchange data or phone calls. The local device 114 may be in general, an unattended communication device, such as M2M or automotive or IoT communication device to exchange at least data through the mobile network. However, the local device may be also a user attended device such as a mobile phone or tablet or smartphone or any other consumer mobile device. In particular, the eUICC 116 contains a SIM application and in a UMTS network a USIM application. An eUICC may contain several applications, making it possible for the same smart card to give access to both GSM and UMTS networks, and may also provide storage of a phone book and other applications. Accordingly, the reference to a SIM module in the following of the present description is intended to include both 2G, 3G, 4G and 5G SIM modules and further generations of mobile communications to which the solution here described is applicable. The nodes 111, 112, 113 may be nodes of such a network or communicate one with the other through other networks or links. With the numerical reference in specifically is indicated a block representing an entity, associated with a respecting node or server of the system no, which is authorized to provide eUICC profiles and/or request operations regarding a profile to be executed locally in an eUICC. In particular, in the example shown, such authorized entity 111 corresponds to the OEM (Original Equipment Manufacturer), e.g., the device 115 manufacturer, back-end. In the case of industrial eUICCs it is usually the OEM, the same manufacturer of the devices that installs or update the profiles. In variant embodiments, which may be more suitable to consumer eUICCs, the authorized entity 111 may also correspond to the service provider or MNO.

The system 110 includes then a repository server 112, also identified as Subscription Manager-Operation Discovery (SR-OD) server, which is accessed by the OEM 111, as better detailed in the following for instance through the communications network. The managing architecture 110 includes also a preparation server 113, which is in particular a SM-DP+(Subscription Manager-Data Preparation enhanced) node, in particular a OTA server, configured to interact directly with an LPA 115 of a user equipment 114 via the mobile communication network. The LPA 115 then interfaces with the eUICC 116, also included in the local communication device equipment 114, which can be an eUICC industrial card include in an equipment 114 represent for instance by a M2M device, or an eUICC Consumer card included in an equipment 114 which is a mobile phone or other equipment able to access for communication at least a mobile communication network. The LPA 115 is configured also to access, using the communicating capabilities of the local communication equipment 114, the operation discovery server 112.

In general, the solution here described provides that the OEM 111 accesses the operation discovery server to store an operation request OR for the LPA 115, in particular a request of downloading a profile from a different server, the preparation server 114. The LPA 115 then accesses the operation discovery server 112 to download the operation request OR, if it is available. If the operation request OR is available, the LPA 115 execute a requested operation RO which is specified in the operation request OR, in particular downloads a profile P from the preparation server 112 on the basis of an activation code AC comprised in the operation request OR. Such activation code AC is an activation code as defined under SGP.22 RSP Technical Specification of the GSM, i.e., information issued by an Operator/Service Provider to an End User, used by the End User to request the download and installation of a Profile association and includes a network address UA, e.g., a URL, for the LPA 115 to access and download the profile P, then, in a manner per se known, the LPA 115 installs the profile P in the eUICC 116.

Figure 8:
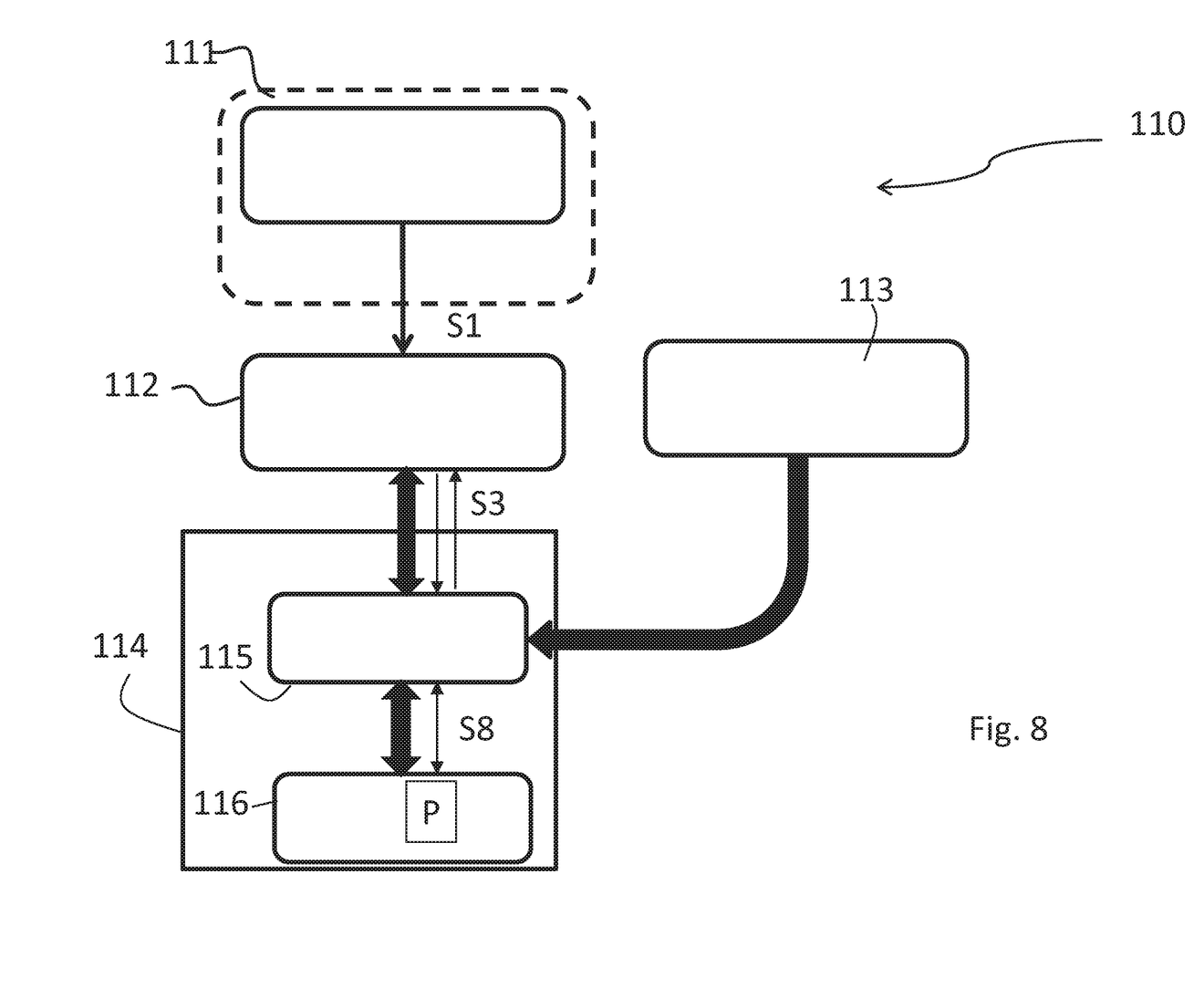
FIG. 8 shows schematically the system in a further phases of operation according to the method here described.

In FIG. 8 is exemplary of an embodiment of the operation request RO. Such operation request RO includes a first eUICC identifier UI, which in particular corresponds to the EID value of the eUICC 116. EID (eUICC ID) is a serial number of the eUICC (defined in SGP.2, SGP.22). Also such operation request RO includes a specification of the requested operation RO, in the case shown a profile download operation. Also the operation request RO includes a signature SN of the OEM 111. Additionally, the operation request OR may include an operation parameter, which in the case of the download operation is an activation code AC. This activation code AC may correspond to a network address UA, e.g. the address of the server 113 at which the profile P to be downloaded is stored.

Figure 9:
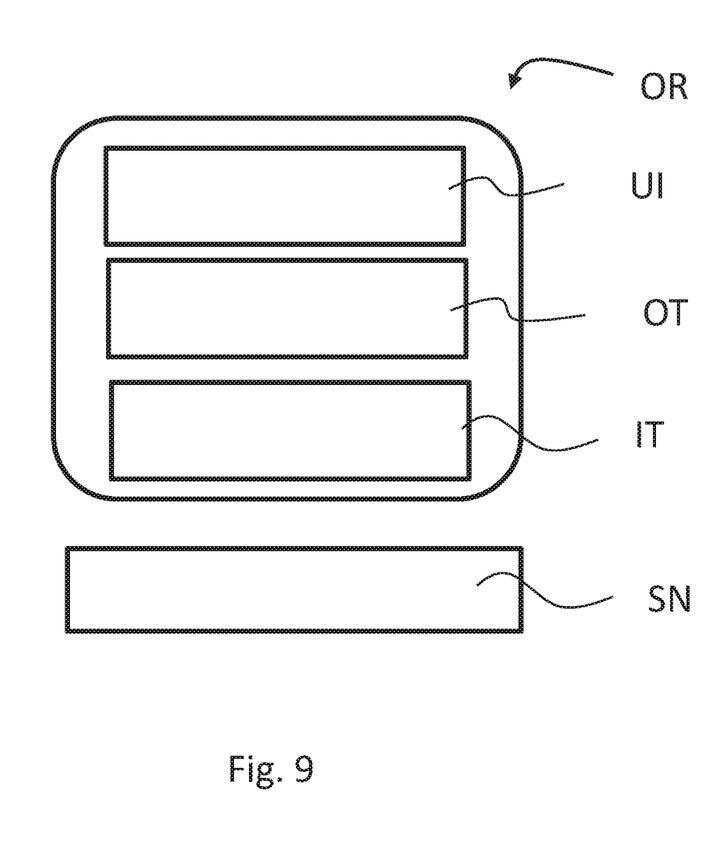
FIG. 9 shows a message exchanged in the phase of FIG. 8.

In FIG. 9 it is shown the operation request RO in case the requested operation OR is an operation on a profile P already stored in the eUICC 116 (as depicted in FIG. 8), e.g. a disable operation. In that case the additional operation parameter is the identifier of the target profile in the eUICC, e.g. the ICCID identifier (Integrated Circuit Card IDentifier). By way of example the operation request contains an operation of the form Enable (#EID, #ICCID), meaning on the card with EID #EID perform the enablement of profile with ICCID=#ICCID.

Figure 4:
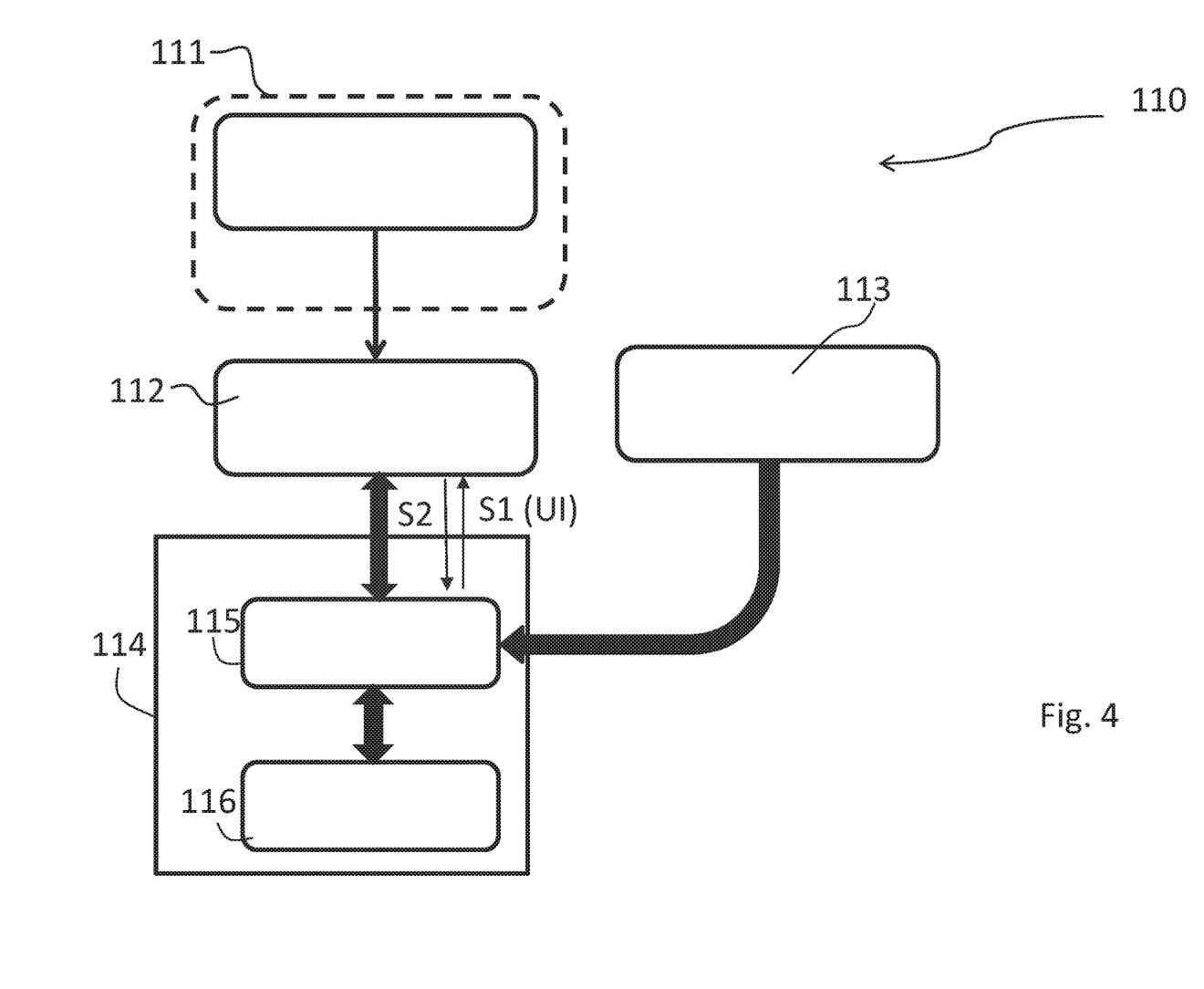
FIGS. 4, 5, 6 show schematically the system in different phases of operation according to the method here described.

In FIG. 4 are the illustrated operations of the method here described with reference to the managing system 110.

The LPA 115 is configured to perform a periodical checking S1 of the repository server 112, checking if an operation request OR corresponding to the eUICC identifier UI is available in the repository server 112. In FIG. 4 is represented a situation where a negative reply S2 is obtained.

Figure 5:
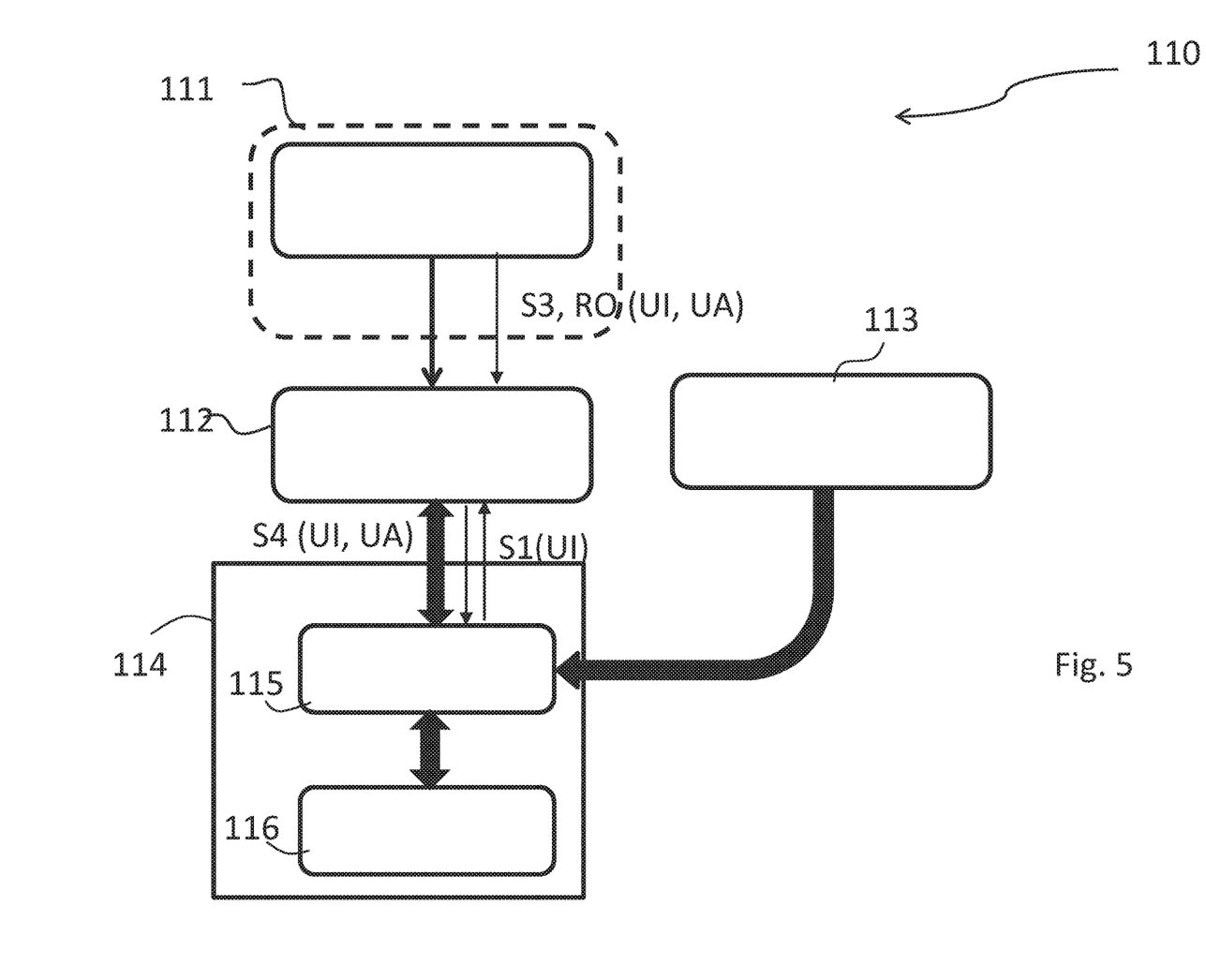

In FIG. 5 it is depicted the situation in which such operation request OR is available. The repository server discovery 112 operates a simple repository managed by the OEM 111 storing in an operation S3 the operation request OR for a given eUICC card identified by the first eUICC identifier UI. Thus, the OEM 111 perform an operation S3 of storing an operation request OR in the repository server 112 including an indication of the requested operation RO and an identifier UI of the eUICC 116.

In the example here described the operation request OR indicates the requested operation of downloading a profile and includes the network address UA of the preparation server 113, in the activation code AC, together with the first eUICC identifier UI.

The checking operation S1 is performed by the LPA 115 by accessing the repository 112 with the first eUICC identifier to verify if there is an operation request OR with a matching first eUICC identifier UI.

The LPA 115 upon verification of a matching first eUICC identifier fetches (or receives) in an operation S4 the operation request OR, including the activation code AC or network address UA.

The check operation S1 is periodical and uses a polling protocol executed by the LPA 115 that verifies the presence of the profile in the repository server 112. The polling period may be also quite long (e.g. 1 week), this fits requirements for profile change in IoT and consumption requirements.

Figure 6:
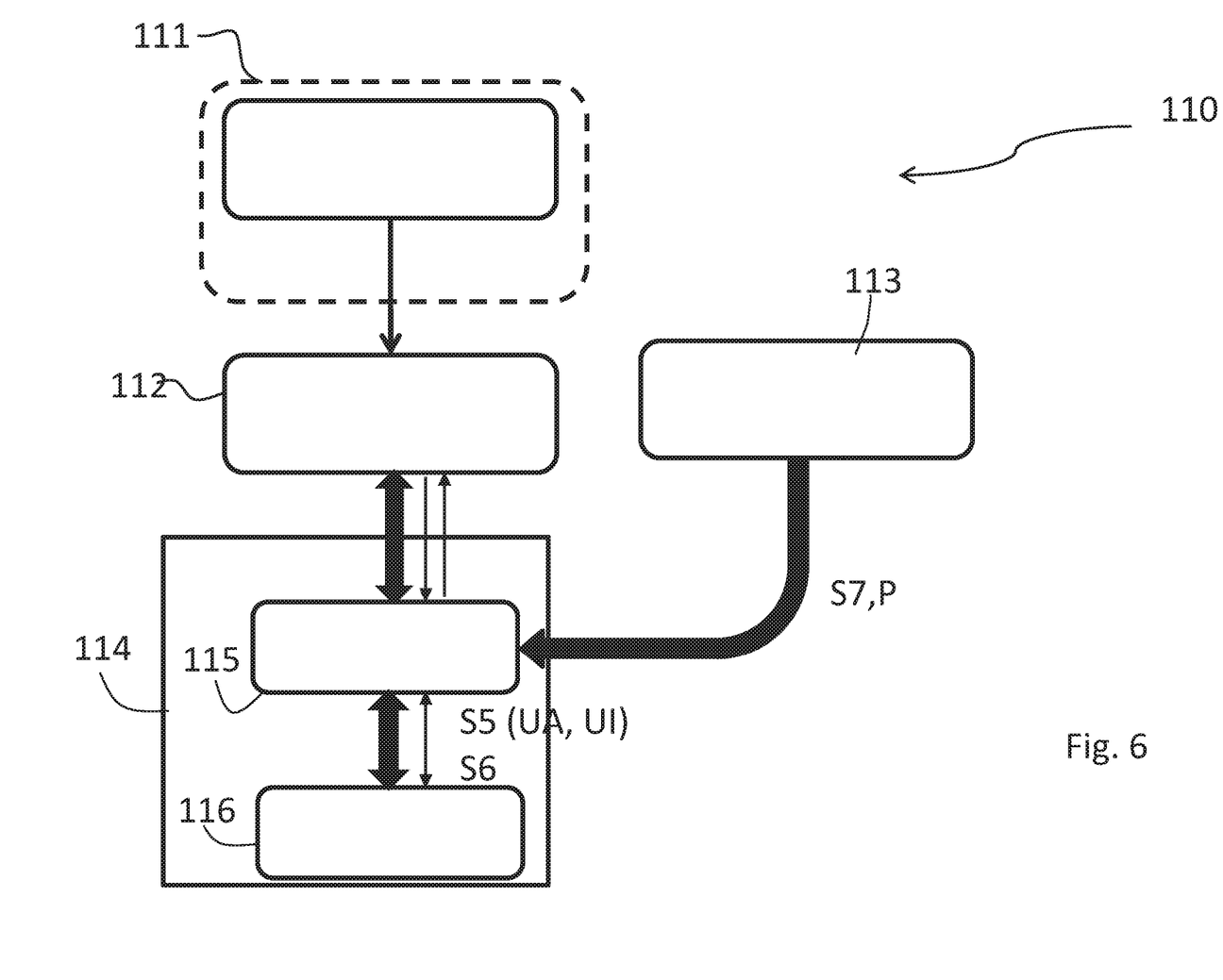
Figure 7:
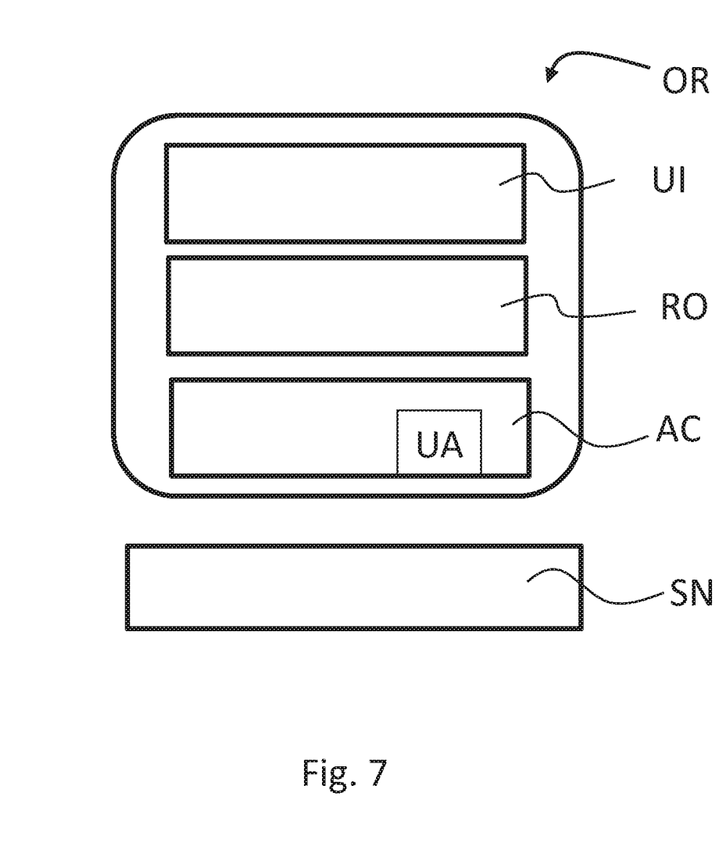
FIG. 7 shows a message exchanged in the phases of FIGS. 4, 5, 6.

Then, as shown in FIG. 6, the LPA 115, prior performing the requested operation RO, may be configured to verify the operation request OR at the local communication equipment 114), on the basis for an instance of the signature SN associated to the operation request OR prior storing in the repository server 112.

The operation request OR received by the repository server 112 may be signed by a OEM key. The signature can be performed by, e.g., an asymmetric scheme where the OEM facilities store the private key and in every eUICC it is stored the public key or a corresponding certificate (like the Elliptic Curve Digital Signature Algorithm—ECDSA) or, e.g., by a symmetric scheme storing the same secret key at OEM facilities and in eUICC. The eUICC 116 contains a certificate and it is configured to verify that the request OR is genuine, in particular verifying the signature SN, using certificate replying with an authentication answer S6. This applies to the ECDSA case, for symmetric it is similar but the verification is done with the secret key, not with the certificate.

Then, after receiving a positive authentication answer S6, the LPA module 115 performs the requested operation, specifically accesses the server 113 at the network address UA and downloads the profile P (operation S7).

As mentioned the operation request OR may include also requested operations OR which are performed on a profile P already stored in the eUICC 116. Such operations may include one among:
Enable profile
Disable Profile
Delete Profile
Retrieve Status All of these are defined as signed token by the repository 112, "polled" by the LPA 15 and executed directly, with no involvement of the SM-DP+ 113. A signed token as shown in FIG. 8 means that the operation request OR includes an activation code token in the sense of SGP.22 and the signature SN. The corresponding operation request OR as mentioned is shown in FIG. 9.

In FIG. 8 it is shown for instance that upon writing S1 an operation request OR corresponding to a requested operation RO of disabling the profile, the LPA module 115 fetches S3 the operation request OR and verify S5 the signature SN and perform the operation S7, disabling the profile identified by the ICCID.

The described solution by adopting an LPA approach, i.e. a profile management module configured to store profiles in the smart card and perform operations on the profiles stored in the smart card upon receiving an operation request from the mobile communication network, is more suitable as avoids interconnections between the SM-DP and the SM-SR server since the LPA module talks directly to the SM-DP+ server (an applet connecting to a server for a single profile).

With respect to the known methods for industrial eUICCs the SM-SR server disappears.

Also the re-usage of the consumer system does not require additional investments in such system to obtain the solution.

In particular, the SM-DP+ server is unaffected.

The LPA software is modified to introduce the polling operation, in order to remove the need of the user interaction, and the execution of commands received by the repository, e.g. SM-OD, server. The polling may operate on a list of server or only on one server.

Although such new server is required, the SM-OD, such server does not contain MNO sensitive information as profiles are not there. It is simply repository of signed operations.

Under this view, the repository server is an "easy" server, stateless, that could also be a mere SFTP (secure File Transfer Protocol) server, where every operation is a file in a folder named as the EID identifier.

Of course, without prejudice to the principle of the invention, the details of construction and the embodiments may vary widely with respect to what has been described and illustrated herein purely by way of example, without thereby departing from the scope of the present invention, as defined by the ensuing claims.

In variant embodiments, the LPA module is implemented fully in the eUICC, reducing the requirements of the communication device.

In variant embodiments, the smart card integrated in the communication device is a card device which allows the download of a different Operating System for each Profile; the smart card is equivalent to an eUICC with the difference that the Profile contains, in addition to Data, Application and Files, also Operating System (OS) components that execute only when the Profile is actually enabled. A way to manage such enhanced profile is e.g. the Virtual Primary Platform architecture defined by GlobalPlatform. The combination of Data, Application, Files and OS components is defined as Bundle or VPP Application. In ETSI it is currently under definition the adaptation of the VPP Application to the Telecom service, defining the features and requirements of the Smart Secure Platform (ETSI TS 103 666 and ETSI TS 103 465). As for the eUICC case, if the secure device is embedded or integrated in a consumer device (eg. a mobile phone), an application on the consumer device equivalent to the LPA can be used to manage the VPP application or Bundles in the secure element and to perform the interaction with the VPP application or bundle server. In this context the method provides using the application on the handset, which represents a profile management module configured to store profiles in the smart card and perform operations on the profiles stored in the smart card upon receiving an operation request from the mobile communication network, i.e. an application or software module corresponding to the LPA in the above context, e.g. of SSP (Smartcard Secure Platform), i.e. the application that downloads/enables/disables/deletes bundles, i.e. enhanced profiles, when the operation request so requires.

What is claimed is:

1. A method, comprising
   storing an operation request in a repository server, the operation request including an indication of an operation to be performed by a device and an identifier of a smart card of the device, the repository server being a server managed by an original equipment manufacturer of the device, the device configured to operate within a mobile communication network;
   periodically checking, by the device, whether an operation request intended for the device is available in the repository server; and
   executing, by the device, the operation request in response to determining that the operation request intended for the device is available in the repository server.

2. The method according to claim 1, wherein the operation request is stored in the repository server by an entity authorized to provide smart card profiles or request operations regarding a profile to be executed by the smart card.

3. The method according to claim 1, wherein:
   the operation request includes a profile download operation;
   the operation request includes a network address of a preparation server in which a profile to be downloaded is stored, the preparation server being different from the repository server; and
   the device, after accessing the operation request, downloads the profile from the preparation server in accordance with the network address.

4. The method according to claim 1, comprising:
associating a signature with the operation request prior to storing the operation request in the repository server;
verifying the operation request by verifying the signature at the device before executing the operation request; and
executing the operation request in response to a positive verification.

5. The method according to claim 1, wherein the requested operation request includes an operation to be performed on a profile stored on the smart card.

6. The method according to claim 1, wherein the requested operation request is an operation to be performed on a profile stored on the smart card, the operation to be performed on the profile being an enable profile operation, a disable profile operation, a delete profile operation, or a retrieve status operation.

7. The method according to claim 6, wherein the operation request is a signed token stored in the repository server.

8. The method according to claim 1, wherein periodically checking comprises periodically polling the repository server according to a given polling period.

9. The method according to claim 1, wherein the operation request includes an identifier of a target profile of the operation.

10. The method according to claim 1, wherein a software profile management module of the device is configured to store profiles on the smart card and to locally execute an associated request operation, the software profile management module being an LPA (Local Profile Assistant) and the smart card being an eUICC (Embedded Universal Integrated Circuit Card).

11. The method according to claim 1, wherein the smart card is a card device configured to allow the download of a different operating system for each profile stored on the smart card, each profile further comprising operating system components that can execute only when the corresponding profile is enabled.

12. The method according to claim 11, wherein the smart card is a card configured to operate according to a Virtual Primary Platform architecture.

13. A communication device comprising:
an integrated smart card; and
a processing circuit in communication with the integrated smart card, the processing circuit configured to:
store profiles in the integrated smart card;
receive an operation request from a repository server, the operation request including an indication of an operation to be performed by the communication device and an identifier of the integrated smart card, the repository server being a server managed by an original equipment manufacturer of the communication device;
periodically check whether an operation request intended for the communication device is available in repository server; and
execute the operation in response to determining that the operation request intended for the communication device is available in the repository server.

14. The communication device according to claim 13, wherein the processing circuit is an LPA (Local Profile Assistant) and the integrated smart card is an eUICC (Embedded Universal Integrated Circuit Card).

15. The communication device according to claim 13, wherein the periodically checking whether the operation request is available in the repository server comprises receiving an authentication reply from a communication network element.

16. The communication device according to claim 13, wherein the operation request comprises an operation on a profile stored in the integrated smart card.

17. The communication device according to claim 13, wherein the integrated smart card is a card device configured to allow the download of a different operating system for each profile stored on the integrated smart card, each profile further comprising operating system components that can execute only when the corresponding profile is enabled.

18. The communication device according to claim 13, wherein the integrated smart card is a card configured to operate according to a Virtual Primary Platform architecture.

19. A system comprising:
a device comprising a smart card integrated therein and a processing circuit in communication with the smart card, the device configured to operate within a mobile communication network; and
a node of the mobile communication network configured to store an operation request in a repository server, the operation request including an indication of an operation to be performed by the device and an identifier of the smart card, the repository server being a server managed by an original equipment manufacturer of the device;
wherein the processing circuit is configured to:
store profiles in the smart card;
periodically check whether an operation request intended for the device is available in the repository server; and
execute the operation request in response to determining that the operation request intended for the device is available in the repository server.

20. The system according to claim 19, wherein the processing circuit is an LPA (Local Profile Assistant) and the smart card is an eUICC (Embedded Universal Integrated Circuit Card).

21. The system according to claim 19, further comprising a preparation server storing a profile to be downloaded;
wherein the operation request includes a profile download operation;
wherein the operation request includes a network address of the preparation server in which a profile to be downloaded is stored, the preparation server being different from the repository server; and
wherein the processing circuit is further configured to download the profile from the preparation server in accordance with the network address after accessing the operation request.

22. The system according to claim 19, wherein the operation request includes an operation on a profile stored on the smart card.

* * * * *

UNITED STATES PATENT AND TRADEMARK OFFICE
CERTIFICATE OF CORRECTION

PATENT NO.         : 11,272,370 B2
APPLICATION NO.    : 16/823004
DATED              : March 8, 2022
INVENTOR(S)        : Amedeo Veneroso It is certified that error appears in the above-identified patent and that said Letters Patent is hereby corrected as shown below:

In the Claims

Claim 5, Column 11, Lines 9-10; delete "requested" after "operation".

Claim 6, Column 11, Lines 12-13; delete "requested" after "operation".

Signed and Sealed this
Third Day of May, 2022

Katherine Kelly Vidal
*Director of the United States Patent and Trademark Office*